United States Patent [19]

McNeely et al.

[11] Patent Number: 4,821,086

[45] Date of Patent: Apr. 11, 1989

[54] TV RECEIVER HAVING IN-MEMORY SWITCHING SIGNAL

[75] Inventors: David L. McNeely, Indianapolis; Russell T. Fling, Noblesville, both of Ind.

[73] Assignee: RCA Licensing Corporation, Princeton, N.J.

[21] Appl. No.: 113,779

[22] Filed: Oct. 28, 1987

[51] Int. Cl.[4] .................. H04N 9/74; H04N 9/76
[52] U.S. Cl. ..................... 358/22; 358/181; 358/183
[58] Field of Search .................. 358/22, 181, 183

[56] References Cited

U.S. PATENT DOCUMENTS

| | | | |
|---|---|---|---|
| 4,015,286 | 3/1977 | Russell | 358/13 |
| 4,016,544 | 4/1977 | Morita et al. | 340/172.5 |
| 4,149,184 | 4/1979 | Giddings et al. | 358/81 |
| 4,163,249 | 7/1979 | Michael | 358/21 R |
| 4,490,797 | 12/1987 | Staggs et al. | 364/522 |
| 4,639,784 | 1/1987 | Fling | 358/167 |
| 4,724,487 | 2/1988 | Casey | 358/183 |
| 4,782,391 | 11/1988 | McNeely et al. | 358/183 |
| 4,789,960 | 12/1988 | Willis | 364/900 |

Primary Examiner—James J. Groody
Assistant Examiner—Robert M. Bauer
Attorney, Agent, or Firm—E. M. Whitacre; E. P. Herrmann

[57] ABSTRACT

A secondary video signal is sampled, digitized and combined with an in-memory switching signal. The combined digital signal is stored in a random access video memory. The stored signal is read out in synchronism with the synchronizing signal components of a primary video signal. The switching signal is recovered from the output of the memory, and compared with a content code signal to develop a fast switching signal. A video output switch, coupled to receive the primary video signal and the stored secondary video signal and responsive to the fast switching signal, applies an appropriate one of the two input signals to the kinescope to define a secondary inset picture within a large primary picture.

12 Claims, 9 Drawing Sheets

700

TV RECEIVER HAVING IN-MEMORY SWITCHING SIGNAL

This invention relates to a TV receiver having a digital overlay feature for producing special effects—such as picture-in-picture and zoom.

BACKGROUND

There has been increasing interest in digital TV due to the greater availability of low cost digital hardware and memories. The digital TV allows the user to reformat the incoming video signals. For example, in a digital TV provided with a pix-in-pix or pip feature, an auxiliary or secondary video signal SVS (e.g., from the VCR second detector) defines a small picture on the display screen which is overlaid on a full picture defined by a main or primary video signal PVS (e.g., from the TV second detector).

Typically, the secondary video signal SVS is sampled and digitized at instants determined by a sampling clock signal. The digital samples representing the secondary video signal SVS are then subsampled, both horizontally and vertically, to develop a stream of samples which represent a reduced size image. For a 3-to-1 reduction in the picture size, every third sample and every third line is saved, and the intermediate samples and lines are discarded.

The digital samples taken during one field or frame of the secondary video signal SVS are stored in a memory. These samples are sequentially read out from the memory using a clock signal which is desirably related to the display deflection signal (e.g., horizontal and vertical synchronizing signal components of the primary video signal PVS). The samples read out from the memory are converted into an analog signal SVS' representative of the reduced-size secondary picture. A video output switch, having input terminals coupled to receive the primary video signal PVS and reduced-size secondary video signals SVS', applies an appropriate one of the two input signals to a display device in response to a fast switching signal FSS to produce a small picture within a large picture. U.S. patent application of McNeely et al., Ser. No. 087,060, and entitled "MULTIPLE INPUT DIGITAL VIDEO FEATURES PROCESSOR FOR TV SIGNALS" describes an illustrative pix-in-pix TV receiver.

SUMMARY OF INVENTION

In accordance with this invention, an n-bit switching signal SS is combined with an m-bit second video signal SVS, where m and n are positive integers greater than one (e.g., m=6 and n=2). In the context of this invention signal SS and SVS are combined by either bit concatenation or time-division-mulitplexing. The combined digital signal is stored in a memory and then read out therefrom in synchronism with the display device. Means coupled to receive the memory output generates a pair of signals: a reconstructed second video signal SVS' and a reconstructed switching singal SS'.

A decoder coupled to receive the reconstructed switching signal SS' and responsive to a context code signal CCS provides a fast switching signal FSS. An output switch, coupled to receive the primary video signal PVS and the reconstructed secondary video signal SVS' and responsive to the fast switching signal FSS, routes to the display device the primary video signal PVS and the reconstructed secondary video signal SVS' when the fast switching signal FSS is respectively conditioned in a first state and a second state.

Pursuant to another aspect of the invention, the secondary video signal SVS is an interlaced video signal consisting of an odd field OF and an even field EF. The memory is provided with two areas for respectively storing the odd and even fields of the secondary video signal SVS. The value of the switching signal SS stored in the two areas of the memory is respectively representative of the odd and even fields of the secondary video signal SVS to be displayed as an inset picture on the kinescope. The value of the switching signal SS stored elsewhere in the memory is representative of the non-passage of the reconstructed secondary video signal to the kinescope.

For example, a 2-bit switching signal SS is set equal to 10 and 01 in the areas of the memory that respectively store the odd and even fields of the secondary video signal SVS. The 2-bit switching signal SS is set equal to 00 in the remaining areas of the memory. When the odd and even fields of the secondary video signal are required for display, the context code signal CCS is set equal to 10 to 01 respectively. The decoder compares the switching signal SS read out from the memory with the context code signal CCS to properly condition the fast switching signal FFS.

The fast switching signal FSS is set equal to a logical one (1) when the odd field is required and the switching signal SS recovered from the memory is equal to 10 and (2) when the even field is required and the recovered switching signal SS is equal to 01. The fast switching signal FSS is set equal to a logical zero otherwise, whereby the first video signal PVS is passed to the display device.

IN THE DRAWINS

DETAILED DESCRIPTION

Figure 1:
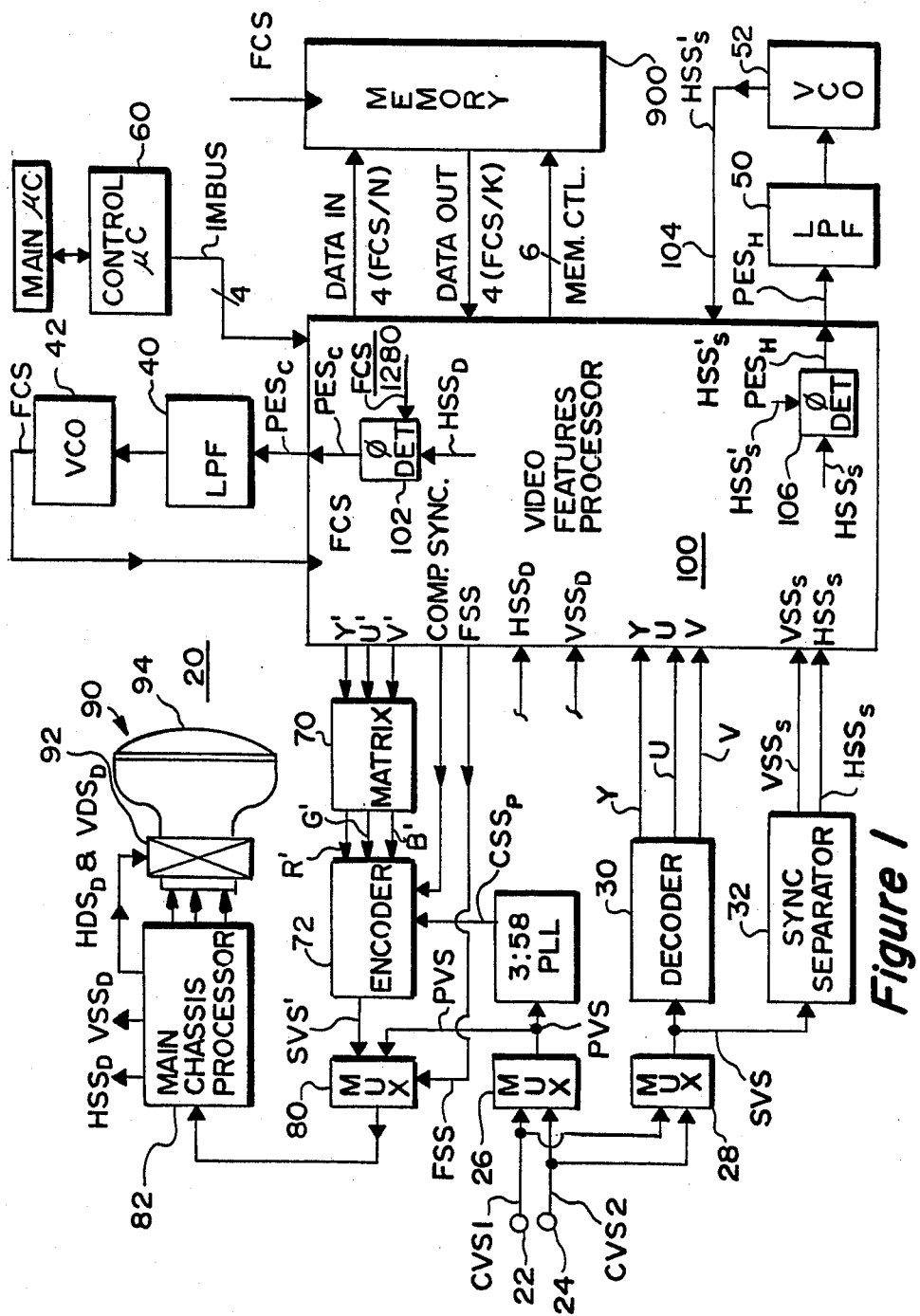
FIG. 1 is a block diagram representation of a TV receiver including a video features processor in accordance with the principles of the present invention.

In the DRAWINGS, the lines interconnecting various blocks represent either signle conductor connections carrying analog singals or buses carrying binary digital signals, as the case may be. A value next to a slash mark intercepting a particular interconnecting line represents the number of parallel connections of that line or bus and a value in the parentheseis next to an interconnecting line represents the repetition rate of the samples on the interconnecting line.

It will be further assumed that the incoming video signal nominally conforms to the NTSC standard format. Examples of signals conforming nominally to the NTSC standard format are video signals produced by a video cassette recorder or a video disc player (hereinafter, non-standard video signals).

FIG. 1 shows a memory-based TV receiver 20 for simultaneously processing video signals from two unrelated sources 22 and 24. The source 22 (e.g., TV second detector) provides a first baseband composite video signal CV1. The source 24 (e.g., VCR second detector develops a second baseband composite video singal CV2.

The first and second composite video signals CV1 and CV2 are each applied to a pair of switches 26 and 28. The switch 26, responsive to a selection signal, selects one of the two input signals CV1 and CV2 (hereinafter referred to as the primary video signal PVS) for application to a first input terminal of a third switch 80 (also referred to as the video output switch). The second switch 28, responsive to another selection signal, applies either the same of the other of the two input signals CV1 and CV2 (hereinafter referred to as the secondary or auxiliary video signal SVS) to a decoder 30 and a sync separator 32. The switches 26 and 28 are known as swap switches.

As previously indicated, the primary video signal PVS develops a full size large picture on the TV screen, on which a reduced-size, small picture developed by the secondary video signal SVS is overlaid. The user decides which of the two incoing video signals CV1 and CV2 is used for defining the large picture and which one is used for defining the small picture.

The decoder 30 includes a lowpass filter (LPF) and a bandpass filter (BPF). The lowpass filter, having an upper cut-off frequency of about 1.5 MHz, passes the luma signal (designated as a secondary luma signal Y) to the exclusion of the chroma signal. The bandpass filter, having a passband of approximately 3.58 MHz±0.5 MHz, recovers the chroma component C from the secondary video signal SVS. A chroma demodulator, coupled to receive the chroma signal C, develops a pair of baseband color difference signals U and V (e.g., R-Y and B-Y).

The sync separator 32 recovers the horizontal and vertical sync signals $HSS_S$ and $VSS_S$ from the secondary video signal SVS. The circuits employed in the decoder 30 and the sync separator 32 are conventional, and, therefore, they are not described in more detail.

The output signals from the decoder and sync separator blocks (i.e., Y, U, V, $HSS_S$) are applied to a video features processor (VFP) 100 of the present invention. The Y, U, V signals are sampled, digitized and multiplexed to generate a streat of 4-bit digital samples in the manner described in detail later. The 4-bit samples are routed to a video random access memory (VRAM) 900 for storage. The stored 4-bit samples are read out from the memory 900 in synchronism with the horizontal and vertical raster scanning signals $HDS_D$ and $VDS_D$, and then routed back to the video features processor 100.

In the video features processor 100, the 4-bit samples read out from the memory 900 are translated back into the analog Y′, U′, and V′ signals. The analog Y′, U′ and V′ signals are applied to a matrix circuit 70, where the Y′, U′ and V′ signals are proportionally combined to produce R, G and B signals. An encoder 72, coupled to receiver the R, G, B signals and responsive to the color subcarrier signal component $CSS_p$ of the primary video signal PVS, generates a reconstructed secondary value signal SVS′ (in the baseband composite form) representative of the reduced-size secondary picture.

The reconstruced secondary video signal SVS′ is applied to a second input terminal of the video output switch 80, the first input terminal of which is coupled to receive the primary video signal PVS. The video switch 80, responsive to a fast switching signal FSS from the video features processor 100, switches between the primary video signal PVS and the reconstructed secondary video singal SVS′ to produce an pix-in-pix (pip) video signal at an output terminal thereof. The pip video signal represents a composite image having a first region which displays the primary video signal PVS and a second, reduced-size region which displays the reconstructed secondary video signal SVS′.

The PIP video signal from the video output switch 80 is applied to the main signal processing circuits 82 of the TV receiver 20. The main signal processing circuits 82 develop red, green and blue drive signals from the PIP video signal. These signals are applied to the respective red, green and blue electron guns of the kinescope 90. The main signal processing circuits 82 additionally develop a pair of horizontal and vertical deflection signals $HDS_D$ and $VDS_D$ for application to the horizontal and vertical deflection windings 92 of the kinescope 90. The red, green and blue electron beams, responsive to the respective drive and deflection signals, scan a raster on the screen 94 to produce the desired small picture within a large picture.

The main signal processing circuits 82 also recover the horizontal and vertical sync signal components $HSS_D$ and $VSS_D$ of the primary video signal PVS. The display deflection signals $HDS_D$ and $VDS_D$ are locked to the horizontal and vertical sync signal components $HSS_D$ and $VSS_D$ of the primary video signal PVS.

The horizontal sync signal component $HSS_D$ of the primary video signal PVS is used for generating a first clock signal FCS, which is locked in phase and frequency therewith. The nominal frequency of the first clock signal FCS is established at 1280 times the frequency $F_H$ of the $HSS_D$ signal. In the NTSC system, the horizontal sync signal frequency $F_H$ is set at 2/455 times the color subcarrier frequency of 3.58 MHz. This, in turn, establishes $F_H$ at about 15.734 KHz and $F_{FCS}$ at about 20 Mhz.

As shown in FIG. 1, the first clock signal FCS is divided by 1280 to generate a signal having a phase that is in alignment with the first clock signal FCS and having a frequency that is about equal to the frequency $F_H$ of the horizontal sync signal component $HSS_D$ of the primary video signald PVS. A phase detector 102 compares the phase of the FCS/1280 signal with the phase of the horizontal sync signal $HSS_D$ (which may be in the form of a flyback signal from the horizontal deflection circuits of the TV receiver) to develop a phase error signal $PES_C$ (here subscript "C" stands for clock). The phase error signal $PES_C$ is lowpass filtered in a filter 40 to enhance its noise immunity, and to remove the input frequencies to the phase detector 102. The lowpass-filtered phase error signal $PES_C$ (LPF) is applied to a voltage controlled oscillator (VCO) 42 to develop the 20 MHz first clock signal FCS, which is locked in phase and frequency with the horizontal sync signal component $HSS_D$ of the primary video signal PVS.

The video features processor 100 uses two clock signals: (1) a first clock signal FCS (also referred to as the main, system, display-locked or line-locked clock signal) that is locked in phase and frequency to the horizontal sync signal component $HSS_D$ of the primary video signal PVS, and (2) a second clock signal SCS (also referred to as the skew-shifted clock signal) which is a phase shifted version of the first clock signal. The second clock signal SCS has its phase shifted once every horizontal line to align with the phase of the horizontal sync signal component $HSS_S$ of the secondary video signal SVS, and has a period that is equal to that of the first clock signal FCS between successive phase adjustment.

If a composite video signal is sampled by a clock singal which is neither phase locked nor line locked to the horizontal synchronizing component of the video signal (which is being sampled), then the samples or pixels may not be aligned vertically. This problem, manifested as jagged vertical edges in the displayed picture, is referred to as the skew or phase error problem. In this particular embodiment of the invention, the secondary video signal SVS is sampled by the second clock signal SCS, which is phase aligned with its horizontal sync signal coponent $HSS_S$ once every line to avoid skew errors.

While the secondary video signal SVS is sampled by a phase-aligned second clock signal SCS, these samples are displayed in synchronism with the first clock signal FCS which is locked to the horizontal synchronizing signal component $HSS_D$ of the primary video signal PVS. Otherwise, skew errors may occur in the displayed inset picture due to misalignment between the $HSS_D$ signal (which controls the timing of the display raster) and the SCS clock signal (which controls the timing of the samples defining the inset picture).

As will be explained later, the video features processor 100 includes a clock transfer circuit to translate samples of the secondary video signal SVS occurring synchronously with the second clock signal SCS to samples occurring synchronously with the display-locked first clock signal FCS. The above-mentioned McNeely et al. application Ser. No. 087,060) disclosed the details of such a two clock video signal processing system.

Figure 2:
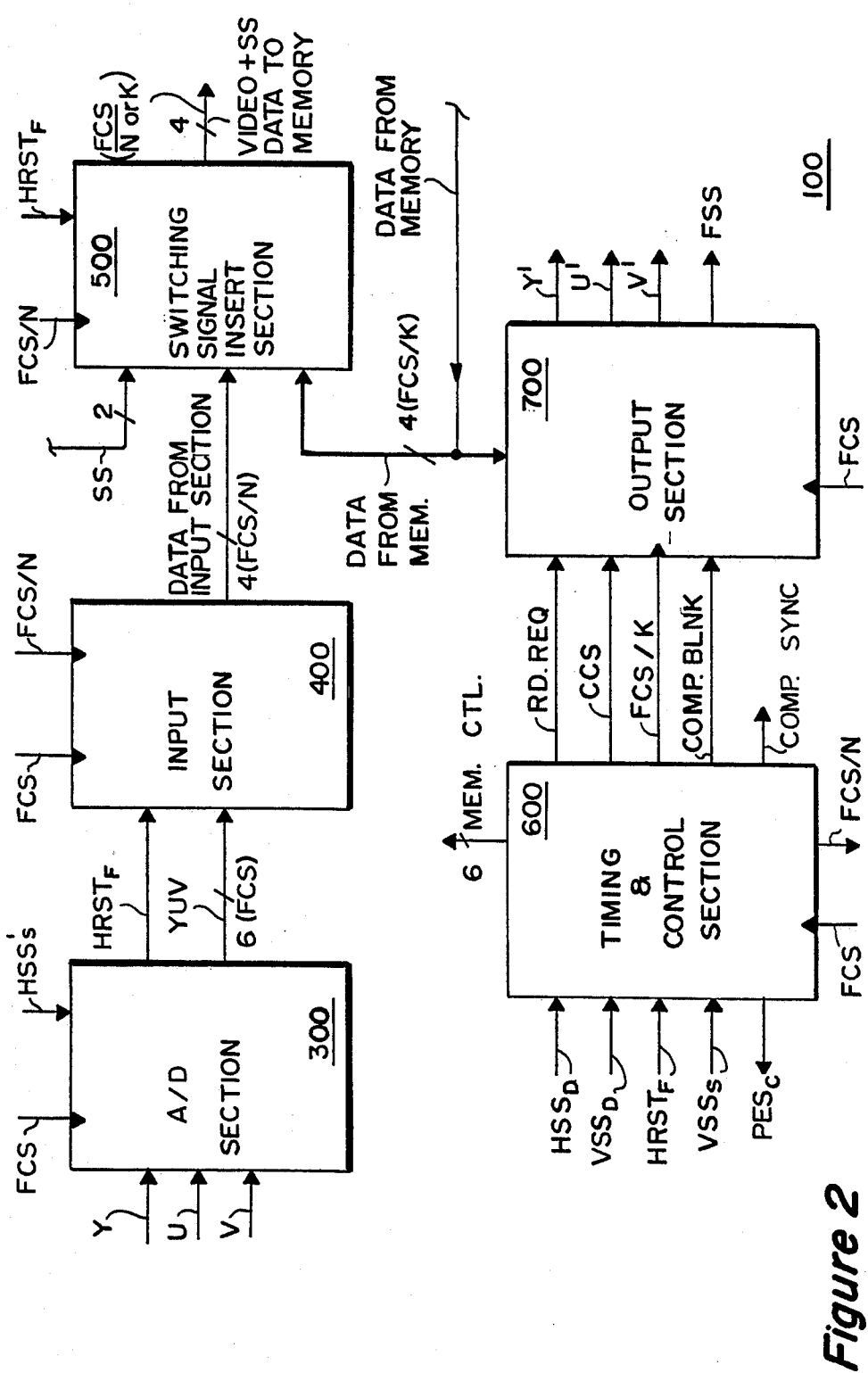
FIG. 2 is a block diagram representation of the video features processor of FIG. 1 comprising analog-to-digital (A/D) section, input section, switching signal insert section, timing and control section and output section.

As illustrated in FIG. 2, the video features processor 100 consists of the below-listed sections:

A/D Section 300,
Input Section 400,
Signal Insert Section 500,
Timing & Control Section 600, and
Output Section 700

These sections will be first briefly described and then each of the above sections will be described in detail in conjunction with FIGS. 3-9.

The main function of the A/D section 300 is to receive the analog, Y, U and V signal from the decoder 30, and convert them into a stream of 6-bit digital samples at the FCS clock rate and having the following sequence: $Y_0, U_0, Y_1, U_0, Y_2, U_0, Y_3, U_0, Y_4, V_0, Y_5, V_0, Y_6, V_0, Y_7, V_0, Y_8, U_1, Y_9, U_1 \ldots$, where the subscripts 0, 1, 2 . . . represent the sample numbers. The A/D section 300 additionally serves to provide a signal $HRST_F$ to the input section 400, which represents the timing of the first sample or pixel in each line of the secondary video signal SVS. (See FIG. 9).

The input section 400 receives the 6-bit digital samples from the A/D section 300 at the FCS rate, and translates them into a sequence of 4-bit nibbles occurring at the FCS/N rate, where N is an integer representative of the sample reduction or decimation factor. For example, to generate a small picture one third the size of the full picture, N is set equal to three. The format of the 4-bit nibbles is given below:

TABLE 1

| NIBBLE NUMBER | NIBBLE BIT NUMBER | | | |
|---|---|---|---|---|
| | 0 | 1 | 2 | 3 |
| 0 | $Y_0(0)$ | $Y_0(1)$ | $Y_0(2)$ | $U_0(0)$ |
| 1 | $Y_0(3)$ | $Y_0(4)$ | $Y_0(5)$ | $U_0(1)$ |
| 2 | $Y_N(0)$ | $Y_N(1)$ | $Y_N(2)$ | $U_0(2)$ |
| 3 | $Y_N(3)$ | $Y_N(4)$ | $Y_N(5)$ | $U_0(3)$ |
| 4 | $Y_{2N}(0)$ | $Y_{2N}(1)$ | $Y_{2N}(2)$ | $U_0(4)$ |
| 5 | $Y_{2N}(3)$ | $Y_{2N}(4)$ | $Y_{2N}(5)$ | $U_0(5)$ |
| 6 | $Y_{3N}(0)$ | $Y_{3N}(1)$ | $Y_{3N}(2)$ | X |
| 7 | $Y_{3N}(3)$ | $Y_{3N}(4)$ | $Y_{3N}(5)$ | X |
| 8 | $Y_{4N}(0)$ | $Y_{4N}(1)$ | $Y_{4N}(2)$ | $V_0(0)$ |
| 9 | $Y_{4N}(3)$ | $Y_{4N}(4)$ | $Y_{4N}(5)$ | $V_0(1)$ |
| 10 | $Y_{5N}(0)$ | $Y_{5N}(1)$ | $Y_{5N}(2)$ | $V_0(2)$ |
| 11 | $Y_{5N}(3)$ | $Y_{5N}(4)$ | $Y_{5N}(5)$ | $V_0(3)$ |
| 12 | $Y_{6N}(0)$ | $Y_{6N}(1)$ | $Y_{6N}(2)$ | $V_0(4)$ |
| 13 | $Y_{6N}(3)$ | $Y_{6N}(4)$ | $Y_{6N}(5)$ | $V_0(5)$ |
| 14 | $Y_{7N}(0)$ | $Y_{7N}(1)$ | $Y_{7N}(2)$ | X |
| 15 | $Y_{7N}(3)$ | $Y_{7N}(4)$ | $Y_{7N}(5)$ | X |
| 16 | $Y_{8N}(0)$ | $Y_{8N}(1)$ | $Y_{8N}(2)$ | $U_N(0)$ |
| 17 | $Y_{8N}(3)$ | $Y_{8N}(4)$ | $Y_{8N}(5)$ | $U_N(1)$ |
| 18 | ... | ... | ... | ... | where the subscripts 0, N, 2N . . . represent sample numbers, where the numbers 0, 1, 2 . . . in the parenthesis represent bit numbers of 6-bit samples and where X represents a blank space for one of the two bits of a 2-bit switching singal SS.

The switching signal insert section 500 inserts the respective bits of the 2-bit switching signal SS in the bit positions provided for them in the 4-bit nibbles obtained from the input section 400. The 4-bit output of the switching signal insert section 500 is routed to the memory 900, and has the below-indicated format:

TABLE 2

| NIBBLE NUMBER | NIBBLE BIT NUMBER | | | |
|---|---|---|---|---|
| | 0 | 1 | 2 | 3 |
| 0 | $Y_0(0)$ | $Y_0(1)$ | $Y_0(2)$ | $U_0(0)$ |
| 1 | $Y_0(3)$ | $Y_0(4)$ | $Y_0(5)$ | $U_0(1)$ |
| 2 | $Y_N(0)$ | $Y_N(1)$ | $Y_N(2)$ | $U_0(2)$ |
| 3 | $Y_N(3)$ | $Y_N(4)$ | $Y_N(5)$ | $U_0(3)$ |
| 4 | $Y_{2N}(0)$ | $Y_{2N}(1)$ | $Y_{2N}(2)$ | $U_0(4)$ |
| 5 | $Y_{2N}(3)$ | $Y_{2N}(4)$ | $Y_{2N}(5)$ | $U_0(5)$ |
| 6 | $Y_{3N}(0)$ | $Y_{3N}(1)$ | $Y_{3N}(2)$ | $SS_0(0)$ |
| 7 | $Y_{3N}(3)$ | $Y_{3N}(4)$ | $Y_{3N}(5)$ | $SS_0(1)$ |
| 8 | $Y_{4N}(0)$ | $Y_{4N}(1)$ | $Y_{4N}(2)$ | $V_0(0)$ |
| 9 | $Y_{4N}(3)$ | $Y_{4N}(4)$ | $Y_{4N}(5)$ | $V_0(1)$ |
| 10 | $Y_{5N}(0)$ | $Y_{5N}(1)$ | $Y_{5N}(2)$ | $V_0(2)$ |
| 11 | $Y_{5N}(3)$ | $Y_{5N}(4)$ | $Y_{5N}(5)$ | $V_0(3)$ |
| 12 | $Y_{6N}(0)$ | $Y_{6N}(1)$ | $Y_{6N}(2)$ | $V_0(4)$ |
| 13 | $Y_{6N}(3)$ | $Y_{6N}(4)$ | $Y_{6N}(5)$ | $V_0(5)$ |
| 14 | $Y_{7N}(0)$ | $Y_{7N}(1)$ | $Y_{7N}(2)$ | $SS_N(0)$ |
| 15 | $Y_{7N}(3)$ | $Y_{7N}(4)$ | $Y_{7N}(5)$ | $SS_N(1)$ |
| 16 | $Y_{8N}(0)$ | $Y_{8N}(1)$ | $Y_{8N}(2)$ | $U_N(0)$ |
| 17 | $Y_{8N}(3)$ | $Y_{8N}(4)$ | $Y_{8N}(5)$ | $U_N(1)$ |
| 18 | ... | ... | ... | ... | where the subscripts 0, N, 2N . . . represent sample numbers, where the numbers 0, 1, 2 . . . in the parenthesis represent bit numbers.

The 4-bit nibbles stored in the memory 900 are retrieved in response to a 6-bit memory contron signal from the timing and control section 600 and routed to the output section 700. The output section 700 receives the 4-bit nibbles, and translates them into the analog luma and color difference signals Y', U' and V' representative of the reduced-size picture to be displayed as an inset in the main picture formed by the primary video signal PVS. In addition to the Y', U' and V' signals, the output section 700 provides the fast switching signal FSS for application to the output switch 80.

The timing and control section 600 receives the horizontal and vertical synchronizing signal components of the primary and secondary video signal PVS and SVS, and generates a number of control signals, including the 6-bit memory control signal.

Figure 3:
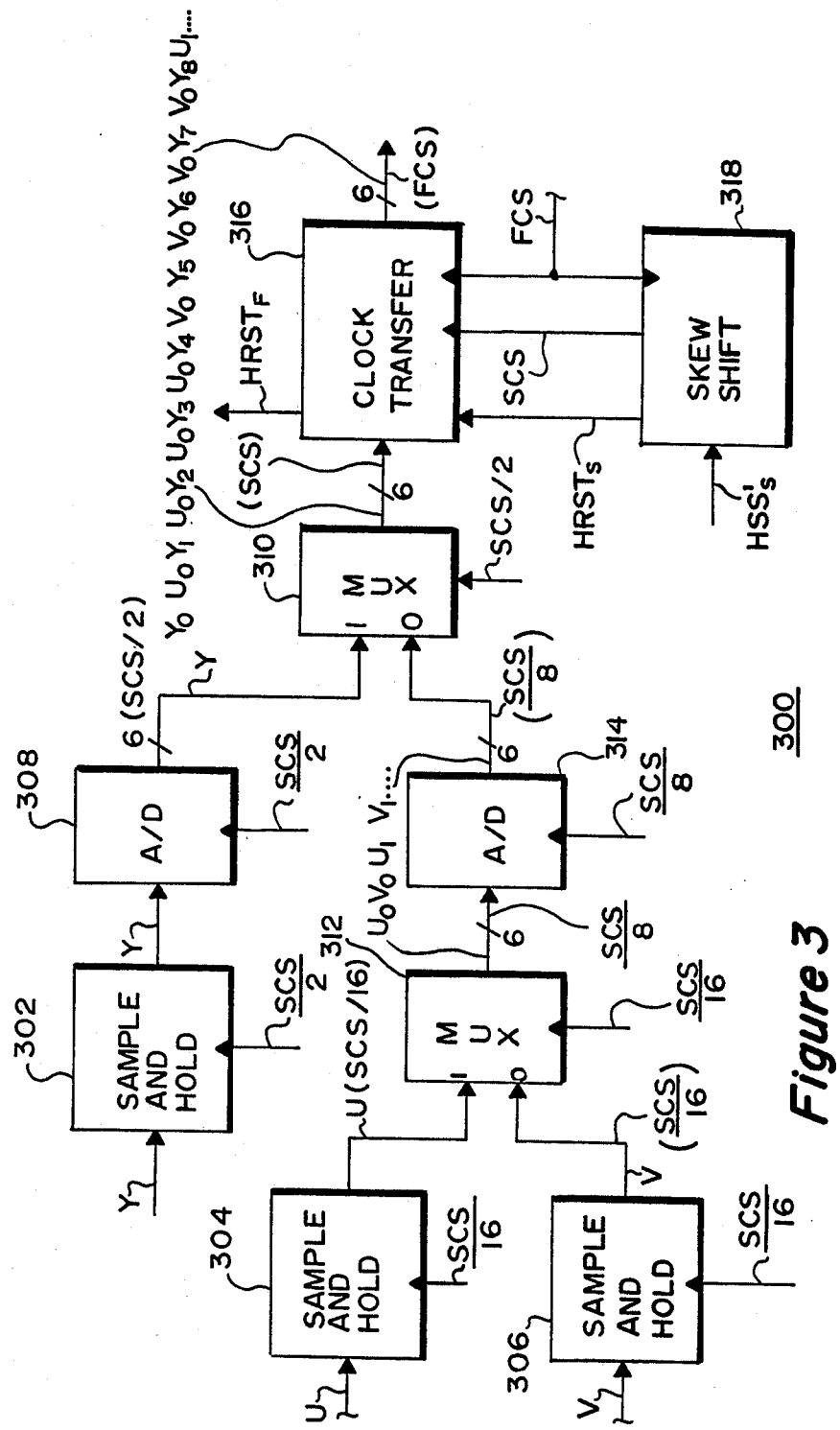
FIG. 3 is a detailed block diagram of the A/D section.

FIG. 3 depicts the A/D section 300. The Y, U and V components of the secondary video signal SVS are applied to the respective sample-and-hold circuits 302, 304 and 306. The sample-and-hold circuit 302 samples the luma signal Y at instants determined by the SCS/2 clock signal, and holds the value between successive sampling points. An A/D converter 308, responsive to the SCS/2 clock signal, converts the sampled luma signal Y into a stream of 6-bit digital samples at the SCS/2 rate (i.e., about 10, MHz). The output of the luma A/D converter 308 is applied to a first input terminal of a multiplexor 310 (hereinafter "mux").

The sample-and-hold circuits 304 and 306, responsive to the SCS/16 clock (about 1.25 MHz), generate samples of the U and V signals. The sampled U and V signals, occurring at the SCS/16 rate, are applied to a mux 312. The mux 312, responsive to the SCS/16 clock, produces a stream of multiplexed samples occurring at the SCS/8 rate (about 2.5 MHz), and having the following sequence: $U_0, V_0, U_1, V_1, U_2, V_2 \ldots$ etc.

An A/D converter 314, responsive to the SCS/8 clock, converts the $U_0, V_0, U_1, V_1 \ldots$ stream into a series of 6-bit digital samples. The 6-bit $U_0, V_0, U_1$ and $V_1 \ldots$ etc. samples at the SCS/8 rate from the A/D converter 314 are routed to a second input terminal of the mux 310, the first input terminal of which receives the 6-bit luma samples $Y_0, Y_1, Y_2 \ldots$ etc. occurring at the SCS/2 rate. The mux 310, responsive to the SCS/2 clock signal, generates a stream of 6-bit digital samples occurring at the SCS rate (about 20 MHz), and having the following sequence: $Y_0, U_0, Y_1, U_0, Y_2, U_0, Y_3, U_0, Y_4, V_0, Y_5, V_0, Y_6, V_0, Y_7, V_0, Y_8, U_1 \ldots$, etc.

The output of the mux 310 is routed to a clock transfer circuit 316, which is basically a first-in-first-out (FIFO) transfer device. The clock transfer circuit 316, responsive to the first and second clock signals FCS and SCS, translate a stream of YUV samples occurring synchronously with the SCS clock signal to a stream of YUV samples occurring synchronously with the FCS clock signal. The aforesaid U.S. patent application of McNeely et al. (Ser. No. 087,060) describes a suitable clock transfer circuit.

The FIG. 3 A/D section 300 is equipped with a skew shifter or phase alignment circuit 318 for generating the second clock signal SCS. The skew shift circuit 318 requires a stable reference signal $HHS_S'$. This is accomplished by means of a phase lock loop 104 shown in FIG. 1. A voltage controlled oscillator (VCO) 52, responsive to a lowpass filtered phase error signal $PES_H$ (LPF), generates the stabilized $HSS_S'$ signal. (Here, the subscript "H" stands for the horizontal sync signal.) A phase detector 106 compares the phases of the two signals $HSS_S$ and $HSS_S'$, and generates the phase error signal $PES_H$. The phase error signal $PES_H$ is routed through a lowpass filter (LPF) 50 and applied to the VCO 52.

Figure 9:
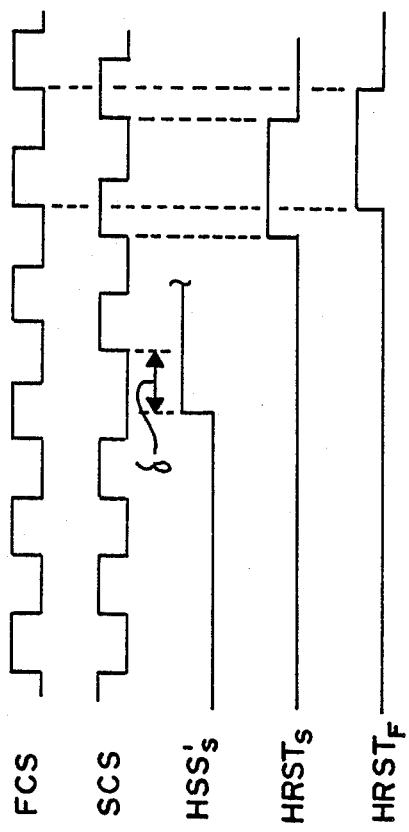
FIG. 9 depicts timing diagram useful in understanding the operation of the FIG. 1 video features processor.

The waveforms shown in FIG. 9 illustrate the operation of the skew shifter circuit 318. To develop the SCS signal, the phase of the first clock signal FCS is shifted in response to the occurrence of every pulse of the horizontal sync signal component $HSS_S'$ of the secondary video signal SVS, so that there is a fixed spacing $\delta$ between the respective signal transitions (e.g., rising edges). U.S. patent application, Ser. No. 082,419, entitled "SIGNAL PHASE ALIGNMENT CIRCUITRY", and filed in behalf of McNeely, describes a suitable skew shifter circuit 318.

In addition to translating the samples occurring synchronously with the SCS clock to the samples occurring synchronously with the FCS clock, the clock transfer circuit 316 provides a reset signal $HRST_F$, depicted in FIG. 9, which represents the first sample of the secondary video signal SVS that is in alignment with the first clock signal FCS. In FIG. 9, the $HRST_S$ represents the timing of the first sample of the secondary video signal SVS that is occurring synchronously with the SCS clock signal. The reset signal $HRST_F$ is used for timing various signal processing operations in the video features processor 100.

Figure 4:
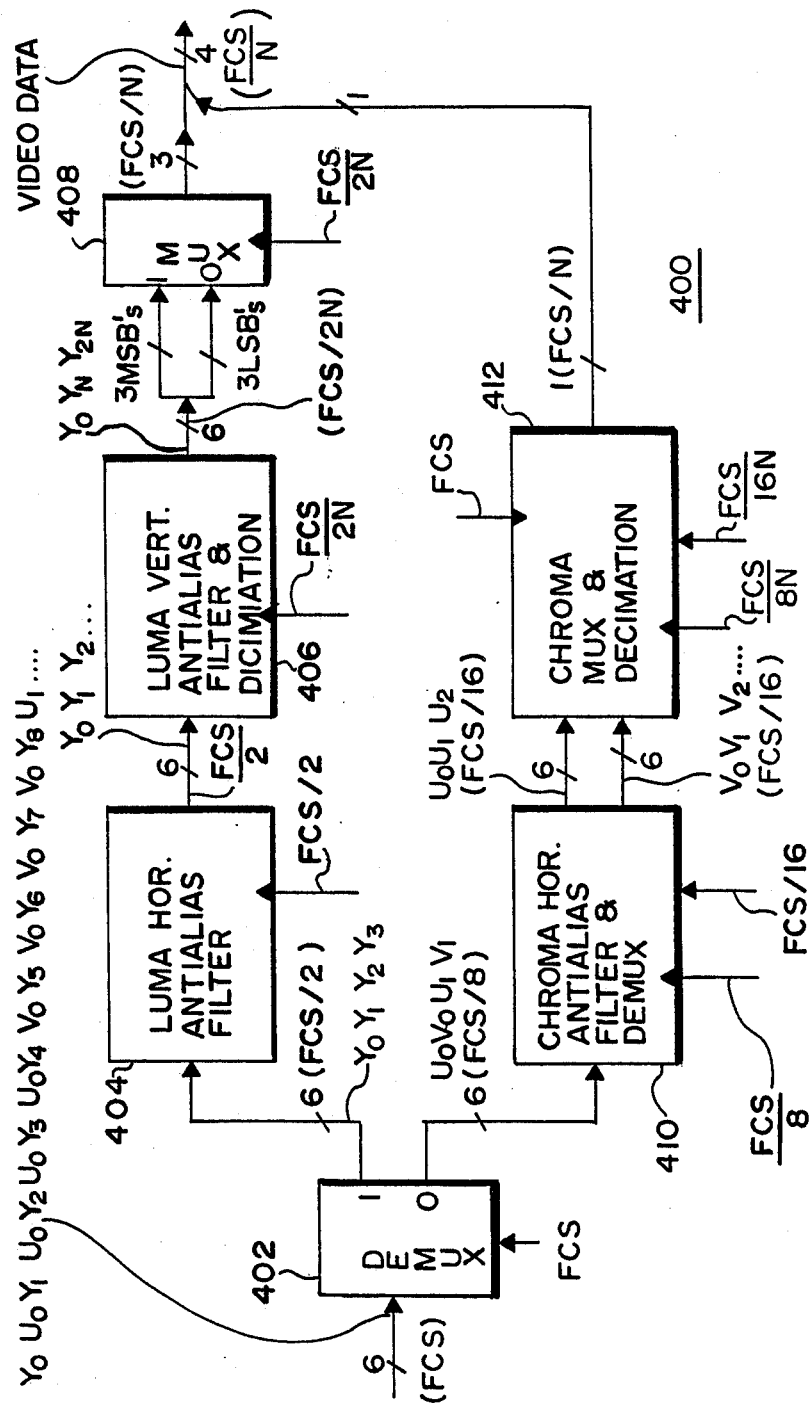
FIG. 4 is a detailed block diagram of the input section.

FIG. 4 shows the input section 400. As previously indicated, the input section 400 receives the 6-bit YUV samples occurring at the FCS rate, and converts them into a stream of 4-bit nibbles or data occurring at the FCS/N rate, where N is the sample reduction factor. For a 3-to-1 reduction in the picture size, N is equal to 3. To this end, the 6-bit YUV signal from the A/D section 300 is routed to a demultiplexor 402 (hereinafter "demux"). The demux 402, responsive to the FCS clock signal, splits the incoming sample stream into two 6-bit sample streams: (1) a stream of luma samples $Y_0, Y_1, Y_2 \ldots$ occurring at the FCS/2 rate (about 10 MHz), and (2) a stream of chroma samples $U_0, U_0, U_0, U_0, V_0, V_0, V_0, V_0, U_1, U_1, U_1, U_1, V_1, V_1, \ldots$ occurring at the FCS/2 rate.

The 6-bit luma samples Y are applied to a luma horizontal antialiasing filter 404. The output of the horizontal antialiasing filter 404 is applied to a luma vertical antialiasing filter 406. The horizontal and vertical antialiasing filters 404 and 406 limit the highest frequencies of the luma signal Y in the horizontal and vertical directions respectively, so as to reduce aliasing effects in the reduced-size inset picture in the pix-in-pix mode.

The luma vertical antialiasing filter block 406 also includes a decimation circuit. In the pix-in-pix mode, the luma decimation circuit saves every $N^{th}$ sample in the horizontal direction and every $N^{th}$ line in the vertical direction. Intermediate pixels and lines are discarded. Illustratively, the reduction factor N can be any one of the integer vales 2, 3, 4, . . . etc. In the zoom or freeze modes, the reduction factor N is set at one, so that the video signal stored in memory 900 is not subsampled.

The 3 MSB's and 3 LSB's of the 6-bit luma samples $Y_0, Y_1, Y_2 \ldots$ etc. occurring at the FCS/2N rate [i.e., (FCS/2) (1/N)] are respectively routed to the first and second input terminals of a mux 408. The mux 408, responsive to the FCS/2N clock signal, generates a 3-bit sample stream occurring at the FCS/N rate, and having the following format:

TABLE 3

| NIBBLE | NIBBLE BIT NUMBER | | |
|--------|---|---|---|
| NUMBER | 0 | 1 | 2 |
| 0 | $Y_0(0)$ | $Y_0(1)$ | $Y_0(2)$ |

TABLE 3-continued

| NIBBLE NUMBER | NIBBLE BIT NUMBER | | |
|---|---|---|---|
| | 0 | 1 | 2 |
| 1 | $Y_0(3)$ | $Y_0(4)$ | $Y_0(5)$ |
| 2 | $Y_N(0)$ | $Y_N(1)$ | $Y_N(2)$ |
| 3 | $Y_N(3)$ | $Y_N(4)$ | $Y_N(5)$ |
| 4 | $Y_{2N}(0)$ | $Y_{2N}(1)$ | $Y_{2N}(2)$ |
| 5 | $Y_{2N}(3)$ | $Y_{2N}(4)$ | $Y_{2N}(5)$ |
| 6 | $Y_{3N}(0)$ | $Y_{3N}(1)$ | $Y_{3N}(2)$ |
| 7 | $Y_{3N}(3)$ | $Y_{3N}(4)$ | $Y_{3N}(5)$ |
| 8 | $Y_{4N}(0)$ | $Y_{4N}(1)$ | $Y_{4N}(2)$ |
| 9 | $Y_{4N}(3)$ | $Y_{4N}(4)$ | $Y_{4N}(5)$ |
| 10 | $Y_{5N}(0)$ | $Y_{5N}(1)$ | $Y_{5N}(2)$ |
| 11 | $Y_{5N}(3)$ | $Y_{5N}(4)$ | $Y_{5N}(5)$ |
| 12 | $Y_{6N}(0)$ | $Y_{6N}(1)$ | $Y_{6N}(2)$ |
| 13 | $Y_{6N}(3)$ | $Y_{6N}(4)$ | $Y_{6N}(5)$ |
| 14 | $Y_{7N}(0)$ | $Y_{7N}(1)$ | $Y_{7N}(2)$ |
| 15 | $Y_{7N}(3)$ | $Y_{7N}(4)$ | $Y_{7N}(5)$ |
| 16 | $Y_{8N}(0)$ | $Y_{8N}(1)$ | $Y_{8N}(2)$ |
| 17 | $Y_{8N}(3)$ | $Y_{8N}(4)$ | $Y_{8N}(5)$ |
| 18 | ... | ... | ... | where the subscripts 0, N, 2N . . . represent sample numbers, and where the numbers 0, 1, 2 . . . in the parenthesis represent bit numbers of 6-bit samples.

The 6-bit chroma samples $U_0$, $V_0$, $U_1$, $V_1$ . . . etc. (occurring at the FCS/2 rate) from the demux 402 are applied to a chroma horizontal antialiasing filter 410, which limits the highest chroma frequency in the horizontal direction to avoid aliasing effects. The chroma horizontal antialiasing filter 410 includes a demux for separating the chroma signal into a stream of 6-bit $U_0$, $U_1$, $U_2$ . . . etc. samples and a stream of 6-bit $V_0$, $V_1$, $V_2$ . . . etc. samples, each occurring at the FCS/16 rate (about 1.25 MHz).

The two 6-bit chroma sample streams are applied to a chroma mux and decimation block 412. The decimation circuit in the block 412 saves every $N^{th}$ sample in the horizontal direction and every $N^{th}$ line in the vertical direction. Intermediate pixels and lines are discarded from both sample streams. The mux circuit included in the block 412 combines two sample streams and produces a 1-bit sample stream occurring at the FCS/N rate and having the following format:

TABLE 4

| NIBBLE NUMBER | CHROMA BIT |
|---|---|
| 0 | $U_0(0)$ |
| 1 | $U_0(1)$ |
| 2 | $U_0(2)$ |
| 3 | $U_0(3)$ |
| 4 | $U_0(4)$ |
| 5 | $U_0(5)$ |
| 6 | X |
| 7 | X |
| 8 | $V_0(0)$ |
| 9 | $V_0(1)$ |
| 10 | $V_0(2)$ |
| 11 | $V_0(3)$ |
| 12 | $V_0(4)$ |
| 13 | $V_0(5)$ |
| 14 | X |
| 15 | X |
| 16 | $U_N(0)$ |
| 17 | $U_N(1)$ |
| 18 | ... | where the subscripts 0, N, 2N . . . represent sample numbers, where the numbers 0, 1, 2 . . . in the parenthesis represent bit numbers of 6-bit samples and where X represents a blank bit position for one of the two bits of a 2-bit switching signal SS.

The 3-bit luma sample stream occurring at the FCS/N rate and the 1-bit chroma sample stream, also occurring at the FCS/N rate, are concatenaled to generate the 4-bit nibbles occurring at the FCS/N rate and having the format given in TABLE 1.

Figure 5:
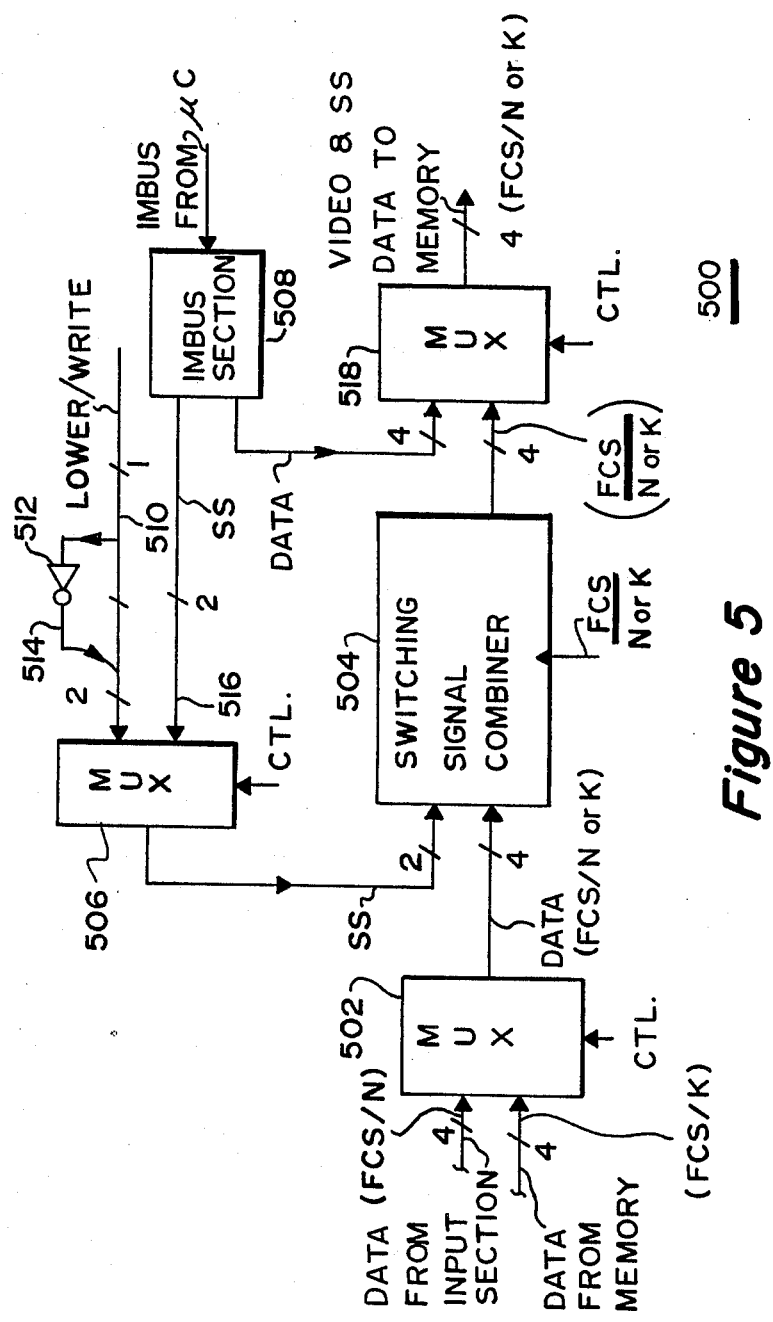
FIG. 5 is a detailed block diagram of the switching signal insert section.

The switching signal insert section 500, shown in FIG. 5, serves to combine the 4-bit nibbles or video data with an associated 2-bit switching signal SS to generate a 4-bit signal having the format illustrated in TABLE 2. The 4-bit nibbles are received from either the input section 400 or from the video memory 900. The data coming from the input section 400 represents the sampled and digitized incoming secondary video signal SVS. The data coming from the memory 900 represents the secondary video signal SVS that has been previously sampled, digitized, stored in the memory, and then read out again for application to the switching signal insert section 500.

There are several reasons why the 4-bit data from the memory 900 may be rerouted through the switching signal insert section 500. For example, it may be desirable to retrieve a block of data, and then copy it verbatim at another location in the memory 900 (to produce a montage-like effect on the screen). Another example may be where it may be desirable to read out a block of data, change the 2-bit switching signal associated with it, and then store it back in the memory 900, either at the same location or at a different location.

This latter feature may be used to insert alphanumeric characters in the stored information. The stored information may be in the form of respective fields of video signal representing different programs (e.g., 9). The characters may be in the form of channel numbers or any other suitable program identifying information (e.g., network designation). These characters may be stored in a portion of the memory 900 that is exclusively dedicated for this purpose. When required, these characters may be read out from the memory 900, combined with the proper switching signal SS and then rerouted to an appropriate place in the memory to provide the channel number identification.

The 4-bit data from the input section 400 and the video memory 900 are routed to a mux 502 in the manner shown in FIG. 5. The data from the input section 400 repeats at the FCS/N rate, where N is the sample reduction rate. In the pix-in-pix mode, the sample reduction rate N is set equal to 2, 3, 4 . . . etc., depending upon the desired reduction in the size of the inset picture. In the zoom and freeze picture modes, N is set equal to 1.

The data read out from the video memory 900 is rerouted to the mux 502 at the FCS/K rate. The rate at which the memory 900 is read out depends upon the mode of the TV receiver. In the pix-in-pix and freeze picture modes, the memory 900 is read out at the full FCS clock rate (i.e. K=1). In the zoom mode, the memory 900 is read out at a reduced FCS/K rate, where K is set equal to 2, 3, 4 . . . etc., depending upon the enlargement or magnification desired. For example, for a 2-to-1 enlargement of a portion of the picture, K is set equal to 2.

The mux 502, in response to a control signal from the timing and control section 600, selects one of the two input streams for application to the first input terminal of a switching signal combiner 504. The other input terminal of the switching signal combiner 504 is coupled to receive the 2-bit switching signal SS.

The 2-bit switching signal SS has four possible states (00, 01, 10 and 11). These four states can be allocated in a number of different ways. To understand the allocaton of the states, it is impotant to know how the state signal SS is used to develop the fast switching signal FSS. As previously indicated, the state signal SS is recovered from the 4-bit data read out from the video memory 900. The reconstructed state signal SS' is compared with a context code signal CCS (supplied by the timing and control section 600) to develop the fast switching signal FSS (e.g., 0 or 1).

In the FIG. 5 embodiment, the upper or odd field of the secondary video signal SVS is stored in the memory 900 in a first designated area. The switching signal SS stored in the first area of the memory 900 (i.e., associated with the upper field of the secondary video signal SVS) is assigned a value of 10.

The lower field or even field of the secondary video signal SVS is stored in the memory 900 in a second designated area. The switching signal SS stored in the second area of the memory 900 (i.e., associated with the lower field of the secondary video signal SVS) is assigned a value of 01.

When the upper (or odd) field of the primary video signal PVS is being displayed and it is desired to display the upper field of the reconstructed secondary video signal SVS' as an inset therein, the timing and control section 600 is programmed to set the context code signal CCS equal to 10. This causes the FSS signal to be a logical one only when the designated first area of the memory 900 (containing the upper field of the SVS' signal) is read out.

When the lower (or even) field of the primary video signal PVS is being displayed and it is desired to display the lower field of the reconstructed secondary video signal SVS' as a small picture therein, the timing and control section 600 sets the context code signal CCS equal to 01. This, in turn, conditions the FSS signal to be a logical one only when the designated second area of the memory 900 (containing the lower field of the SVS' signal) is read out.

The value of the switching signal SS stored in the remaining areas of the video memory 900 is set at 00. When the reconstructed switching signal SS' is 00, the primary video signal PVS is routed to the kinescope 90. The state 11 of the switching signal SS is not used in this particular embodiment.

In another embodiment of the in-memory switching signal system, the video memory 900 is divided into three areas. The successive incoming fields of the secondary video signal SVS (i.e., odd, even, odd . . . etc.) are consecutively stored in the three areas of the memory 900 in a circular or round robin fashion. For example, in the first go-around, the first (odd) field, the second (even) field and the third (odd) field of the incoming secondary video signal SVS are respectively stored in the first, second and third areas of the memory 900. In the second go-around, the fourth (even) field, the fifth odd field and the sixth (even) field are respectively stored in the first, second and third areas of the memory 900, and so on.

An advantage of the circular memory system is that no matter which field (i.e., odd or even) of the incoming secondary video signal SVS is being currently written into the memory 900, there is always another field of the same kind (i.e., odd or even, respectively) available for display, and which is not being written over. For instance, if the fourth even field is being currently written into the first area of the memory 900 (during second go-around) and an even field is required for display, then the second even field previously recorded in the second area of the memory during the first go-around can be read out of the memory and routed to the kinscope 90.

Because signals are written into and read out of the memory 900 at different speeds, depending upon the modality of the TV receiver (i.e., pip, zoom, etc.), it is important to avoid a situation in which a given area of the memory is simultaneously written into and read out. This condition can cause a tear in the displayed picture at points where cross-over between writing and reading occurs. The circular storage feature described above avoids this problem.

To implement the circular storage feature, the switching signal SS stored in the first, second and third areas of the memory 900 is set equal to 01, 10 and 11, respectively. The value or state of the switching signal SS stored elsewhere in the memory 900 is 00. The timing and control section 600 keeps track of the fields stored in the three areas of the memory 900, and establishes the values of the context code signal CCS in a manner that avoids the cross-over or picture tear problem.

It is noted that the in-memory switching signal system of the present invention has a variable associability feature. The reconstructed switching signal SS' does not by itself determine the status of the fast switching signal FSS. The status of the FSS signal is determined by the reconstructed switching signal SS' in conjunction with the context code signal CCS provided by the timing and control section 600 of the video features processor 100.

In the FIG. 5 embodiment, a mux 506 has two inputs: (a) a 2-bit signal which is either 10 or 01, depending upon whether the upper field or the lower field of the incoming secondary video signal is being stored in the memory 900, and (b) a 2-bit signal which is provided by the IMBUS section 508 of the video features processor 100. When the upper field of the secondary video signal SVS is being written into the memory 900, th LOWER/WRITE signal on the line 510, which defines the least significant bit (LSB) of the switching signal SS, goes low. An inverter 512 inverts the signal on the line 510 to provide the most significant bit (MSB) of the SS signal on the line 514, thereby establishing the value of the SS signal at 10. When the lower field of the secondary video signal SVS is being routed to the memory 900, the LOWER/WRITE signal on the line 510 goes high and the signal on the line 514 goes low, whereby the SS signal is set at 01. The LOWER/WRITE signal applied to connection 510 is derived from a conventional odd/even field detector (e.g., LM1881 Video Sync Separator available from National Semiconductor Corp.) which may be incorporated in the sync separator 32 (FIG. 1).

As previously indicated, in one of the embodiments of the in-memory switching signal system, alpha-numeric characters are stored in a portion of the video memory 900 that is exclusively dedicated for this purpose. The switching signal SS associated with the characters stored in this portion of the memory 900 is established at 00, so that these characters are not displayed when this portion of the memory is read out. To insert these characters in the respective fields of the stored video signal for the purpose of identifying the program source, the characters are read out from the memory 900, passed through the switching signal insert section 500 for combining the characters with appropriate switching signal SS (e.g., 10 or 01) and then rerouted back to memory for storage. In this mode, the IMBUS section 508 provides the mux 506 with the desired switching signal SS.

The mux 506, responsive to a control signal, routes the desired 2-bit switching signal SS to the second input terminal of the switching signal combiner 504, the first input terminal of which is coupled to receive the 4-bit video data. The format of the 4-bit video data applied to the combiner 504 depends upon its source. When the video data is from the input section 400, the format is given in TABLE 1. When the data is from the memory 900, the format is as shown in TABLE 2.

The switching signal combiner 504 is a finite state machine, which is repetitively sequenced through a series of states in a round robin fashion (8in this embodiment) in response to a clock signal (FCS/N or FCS/K). Typically, the switching signal combiner 504 includes a counter to keep track of the respective states and a combinational logic circuit to insert the two bits of the switching signal SS into the 4-bit data stream. The two bits of the switching signal SS are inserted in the appropriate place in the manner illustrated in TABLE 2.

It may be desirable to fill the whole of the video memory 900 with a border color (e.g., blue). To this end, the switching signal insert section 500 is provided with an output mux 518. The first and second input terminals of the mux 518 are respectively coupled to the switching signal combiner 504 and the IMBUS section 508. The IMBUS section 508 provides the mux 518 with video data defining the desired border color when needed. The mux 518, responsive to a control signal, chooses an appropriate one of the two input signals for passage to the video memory 900.

The 4-bit nibbles having the format shown in TABLE 2 are written into the video memory 900 in response to a 6-bit memory control signal. The memory 900 is a self-sequencing, dual port memory having separate input and output ports. The memory 900 is arranged as a grid of 4-bit storage locations or cells. There are $2^8$ (256) rows and $2^{10}$ (1024) columns of 4-bit storage locations to hold one entire field of TV signal (i.e., about 2HU 18 or 262,144, 4-bit nibbles).

Reference may be made to U.S. patent application of Willis, Ser. No. 008,729, and entitled "DUAL PORT VIDEO MEMORY SYSTEM HAVING SEMI-SYNCHRONOUS DATA INPUT AND DATA OUTPUT" for a detailed description of a suitable memory of this type. This memory is manufactured by Hitachi Corporation, Model No. HM 53051P, in an integrated circuit form.

The write and read addresses WA and RA are each 13 bits wide. Out of the 13 bits, the 8 MSB's ($2^8$ or 256 positions) define a row address. The 5 LSB's ($2^5$ or 32 blocks) define an address that refers to a block of 32 columns.

In the pix-in-pix mode, the incoming video signal SVS is written into the memory 900 at a reduced speed (e.g., FCS/N and $F_H/N$), while it is read out of the memory at the full speed (e.g., FCS and $F_H$). To this end, the row address component (i.e., 5 MSB's) of the write address signal WA (i.e., 13 bits) is reset to an appropriate row address once every field in response to the vertical sync signal, and is advanced once every N horizontal lines (or horizontal sync signal pulses, where N (2, 3 ...) is the reduction factor. As indicated before, N is set equal to 2, 3 ... in the pix-in-pix mode, and is set equal to 1 in the zoom mode. The column address component (i.e., 8 LSB's) of the write address signal WA is reset to an appropriate column value once every horizontal line in response to the horizontal sync signal, and is advanced once every N pulses of the clock signal FCS. Thus, it will be seen that the digital samples representing the reduced-size inset picture (i.e., the subsampled secondary video signal) are stored at successive locations. The ability to reset the row and column addresses to various values allows the storage of multiple reduced-size fields (e.g., 2) in a field memory. For a 3-to-1 reduction, only one out of 3 successive pixels and one out of 3 successive horizontal lines are stored in the memory 900.

In the pix-in-pix mode the row address component of the read address signal RA is reset to an appropriate starting row address every field, and is advanced every horizontal line. The column address component is reset to an appropriate starting column address every horizontal line, and is advanced every clock cycle. This allows the secondary video signal SVS to be read out of the memory 900 in synchronism with the main picture.

The correspondence between memory address and raster or display position is determined by the starting row and column addresses. When two different fields of the same reduced video image are stored in the field memory at two different locations, the starting row and column address values are changed in synchronism with the context code signal CCS to make visible successive reduced fields in the same display area (e.g., lower right hand corner).

In the zoom mode, the incoming video signal SVS is stored in the memory 900 at the full speed (e.g., FCS and $F_H$), but it is ead out of the memory at a reduced speed (e.g., FCS/K and $F_H/K$), where K is the enlargement factor. To this end, the row address component of the write address signal WA is reset every field and advanced every line. The column address component of the write address signal WA is reset every line and advanced every clock cycle.

In the zoom mode, the row address component of the read address signal RA is reset to an appropriate initial row address every field, but advanced once every K horizontal lines. The column address component is reset to an appropriate initial column address every line and is advanced every K clock cycles. This causes each pixel and each line to repeat K times on the output side of the memory 900 in the zoom mode. The upper left hand corner of the displayed zoomed area is determined by the initial row and column addresses.

As previously indicated, the self-sequencing feature of the video memory 900 dispenses with the need for providing the write and read addresses concurrently with each sample to be written into or read out from the memory. Instead, the write and read addresses WA and RA are initialized only when required for synchronization. Subsequent addresses are automatically generated within the memory 900 starting with the last received address.

As indicated above, in the pip and zoom modes, the information is written into and read out of the memory 900 at a reduced speed (e.g., FCS/N, $F_H/N$ and FCS/K, $F_H/K$). The mechanism by which this is accomplished is through the use of the following signals:

CGW, clock gate write,
WE, write enable, and

CGR, clock gate read.

To store every $N^{th}$ sample at consecutive memory locations in the pipe mode, the clock gate write signal CGW is conditioned to be high once every N clock pulses. To write every $N^{th}$ line into the memory 900 and to skip the intermediate (N−1) lines, the clock gate write signal CGW is conditioned to be in a logical zero state every N−1 lines out of N lines. The write enable signal WE remains high.

When the odd and even fields of the same reduced video image are stored in the field memory at two different locations, the write enable signal WE is used to allow selective storage of the odd field in the first designated area and the even field in the second designated area of the field memory.

To repeat every sample K times in the zoom mode, the clock gate read signal CGR is conditioned to be high once every K clock pulses. To repeat every line K times, each row address is held constant for K lines.

Figure 6:
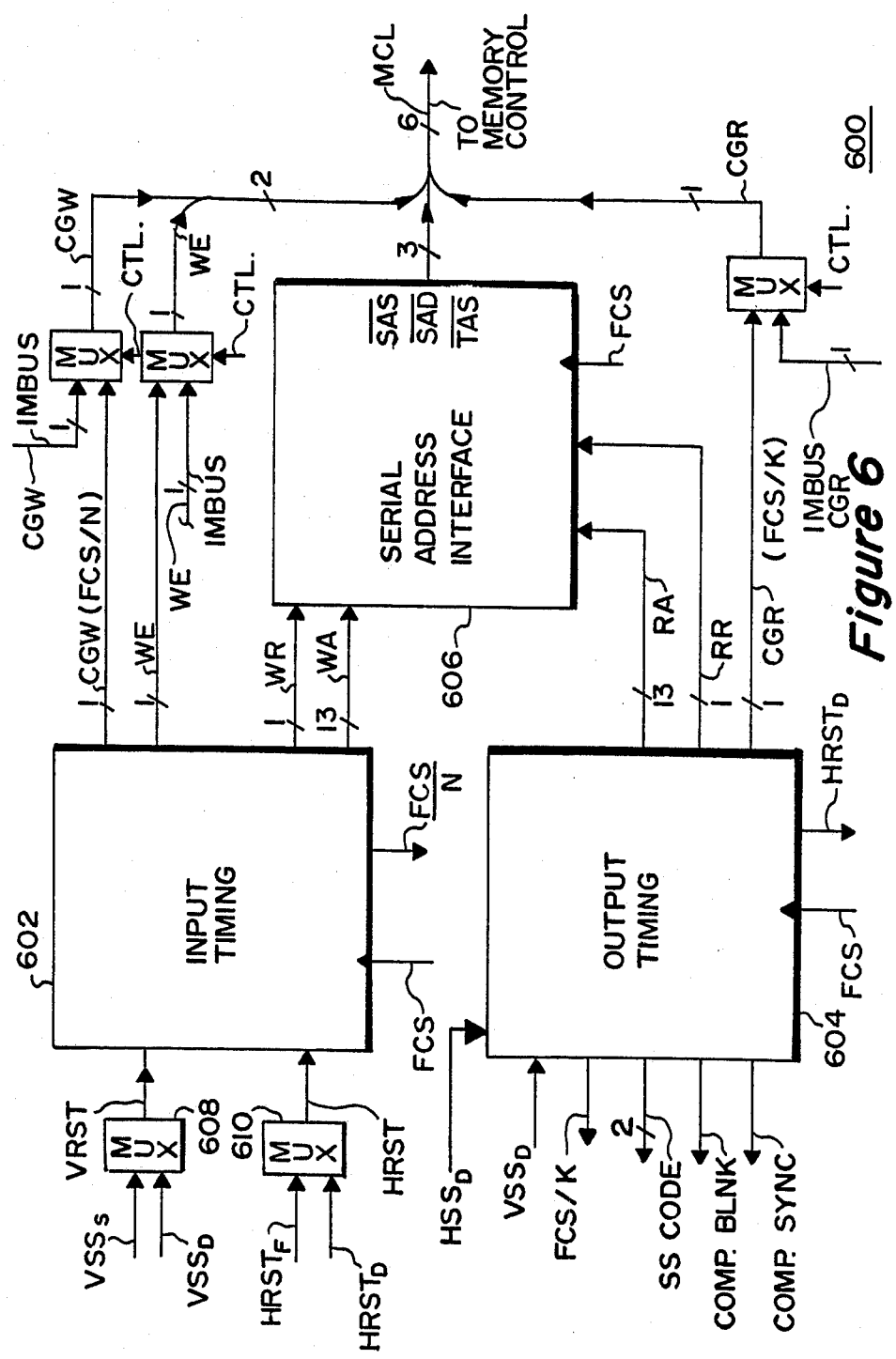
FIG. 6 is a detailed block diagram of the timing and control section.

FIG. 6 illustrates the timing and control section 600, which generates various control signals for timing the writing and reading operations of the memory 900 (e.g., WA, CGW, WE, RA, CGR, etc.). The timing and control section 600 consists of the input timing block 602, output timing block 604 and serial address interface block 606.

The input timing block 602 is coupled to receive the vertical and horizontal reset signals VRST and HRST, which are used for resetting the row and column addresses as is required for the snchronism of the memory 900. When the incoming secondary video signal SVS is stored in the memory 900, the vertical sync signal component $VSS_S$ of the secondary video signal and the $HRST_F$ signal (indicative of the first sample of the secondary video signal in alignment with the FCS clock) are used as the vertical and horizontal reset signals VRST and HRST respectively by the input timing block 602.

When the video data from the memory 900 is being rerouted back to the memory 900 in sychronism with the display deflection signals (e.g., for copying a block of data at another location), the vertical sync signal component $VSS_D$ of the primary video signal PVS and the $HRST_D$ signal (indicative of the first sample of the video signal read out from the memory in alignment with the FCS clock) are used instead as the VRST and HRST signals respectively by the input timing block 602. The muxes 608 and 610 select the appropriate vertical and horizontal reset signals VRST and HRST in response to the respective control signals.

The input timing block 602 generates a 1-bit write request signal WR for application to the serial address interface block 606 to update the write address signal WA. Similarly the output timing block 604 supplies the serial addess interface 606 with a read request signal RR.

The write address signal WA and the write request signal WR from the input timing block 602 are routed to the serial address interface block 606. The clock gate write signal CGW and the write enable signal WE are merged directly with a 3-bit output of the serial address interface block 606.

The output timing block 604, responsive to the vertical and horizontal sync signal components $VSS_D$ and $HSS_D$ of the primary video signal PVS, generates the read address signal RA, the clock gate read signal CGR and the read request signal RR. The read address signal RA and the read request signal RR are routed to the serial address interface block 606. The clock gate read signal CGR from the output timing block 604 is merged directly with the 3-bit output of the serial address interface block 606.

The serial address interface block 606, coupled to receive the write and read addresses and the write and read requests, generate three, 1-bit signals:
$\overline{SAS}$, address clock signal,
$\overline{SAD}$, serial address signal, and
$\overline{TAS}$, address transfer signal.

Basically, $\overline{SAS}$ is agated clock signal that controls the rate of transfer of the serial address data to the memory 900. $\overline{SAD}$ consists of a 32 bit packet comprising the 13-bit write address signal, 13-bit read address signal and 6 bits of control information (i.e., flags, etc.). The $\overline{TAS}$ signal effects the actual transfer of the 32 bits of data when it goes low.

The 3-bit output of the serial address transfer block 606 is merged with the three, 1-bit signals CGW, WE and CGR to define the 6-bit memory control signal MCL. Reference may be made to aforesaid U.S. patent application, Ser. No. 008,729, of Willis for further details on the various memory control signals.

Figure 7:
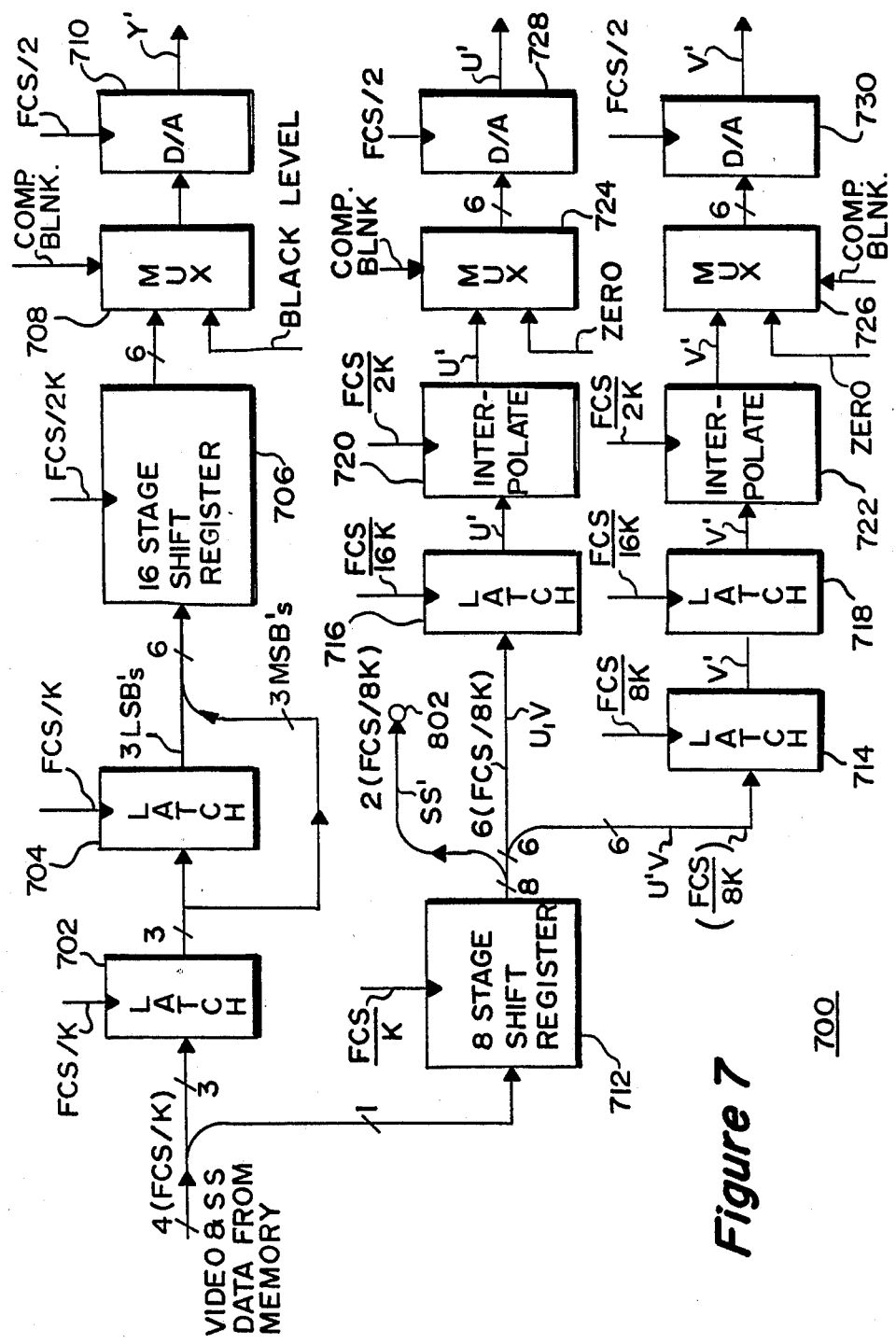
FIG. 7 is a detailed block diagram of the output section.

FIG. 7 is the output section 700, which converts the 4-bit video data from the memory 900 into the analog Y', U' and V' signals for application to the RGB matrix 70 and the composite signal encoder 72. As previously indicated, K is the enlargement factor, which is set equal to 2, 3, 4 . . . in the zoom mode. In the pix-in-pix mode, K is set equal to 1.

The 3 MSB's of the 4-bit video data, having the format shown in TABLE 2 and occurring at the FCS/K rate, are applied to a pair of cascade-connected latches 702 and 704, both of which are driven by the FCS/K clock signal. The first latch 702 synchronizes the data with the FCS/K clock signal. The 3 MSB's at the input of the latch 704 are combined with the 3 LSB's at its output to develop a 6-bit luma sample Y.

The 6-bit luma sample Y is applied to a 16-stage-by-6-bit shift register 706. The 16-stage shift register 606, responsive to the FCS/2K clock signal, delays the incoming luma sample Y, so that it is aligned with the associated U' and V' samples.

A mux 708, responsive to a composite blanking signal from the output timing block 604, inserts the desired black level into the luma signal Y'. The D/A converter 710, responsive to the FCS/2 clock signal, develops the analog luma signal Y'.

The LSB of the 4-bit video data from the memory 900 is applied to a 8-stage (serial input-parallel output) shift register 712, which is driven by the FCS/K clock signal. The 8-bit shift register 712 develops an 8-bit sample at its output, the two LSB's of which represent the reconstructed switching signal SS'.

The 6 MSB's of the 8-bit signal from the shift register 712 represent the 6-bit U and V signals in an alternating fashion. A latch 714 lines up the 6-bit U and V samples. A pair of latches 716 and 718 separate the U' and V' samples respectively.

The outputs of the latches 716 and 718 are applied to the respective interpolators 720 and 722. The interpolators 720 and 722 smooth out the sharp steps in the U' and V' signals by generating additional samples. The muxes 724 and 726 insert the desired black levels in the U' and V' signals in response to the composite blanking signal. The D/A converters 728 and 730 develop analog U' and V' signals.

Figure 8:
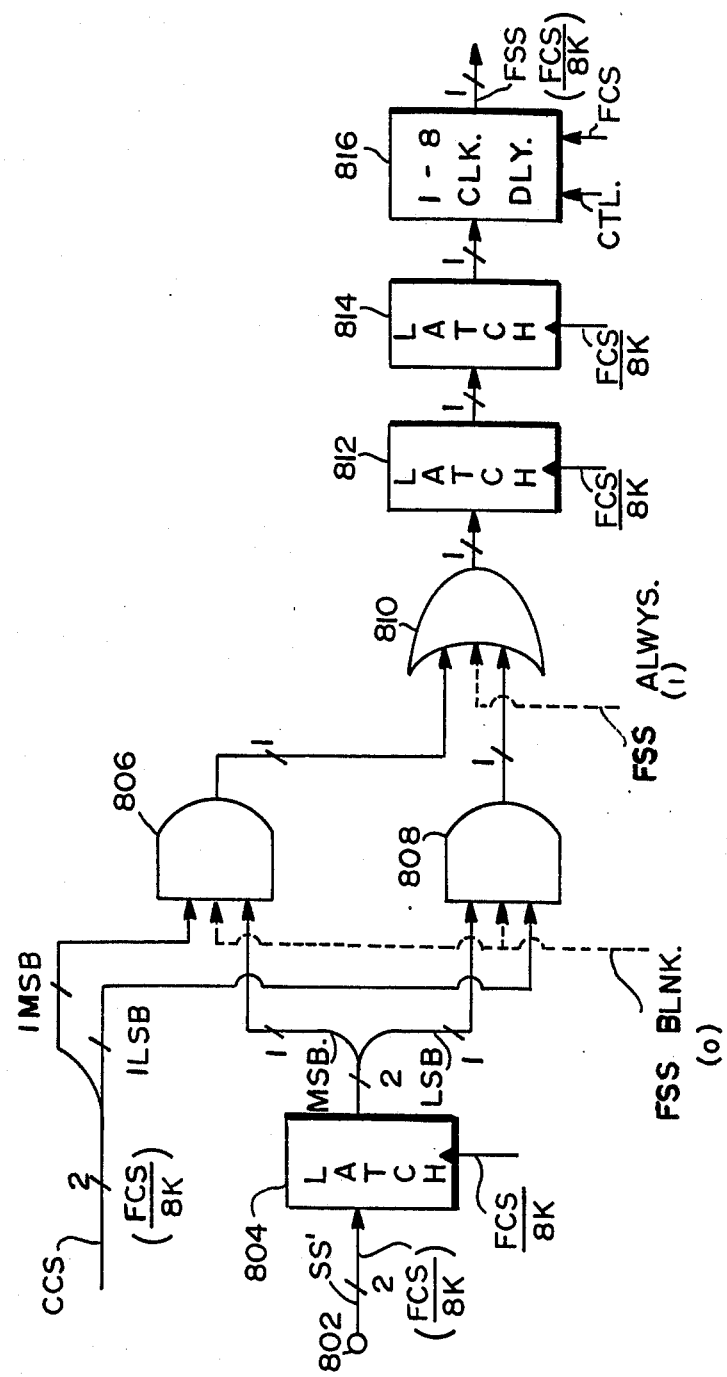
FIG. 8 is a block diagram representation of a circuit for generating a fast switching signal FSS.

FIG. 8 illustrates a decoder 800, which is a part of the output section 700 of the video features processor 700. The decoder 800 receives the reconstructed switching signal SS' from the FIG. 7 apparatus 700 and the context code signal CCS from the timing and control section 600. The output of the decoder 800 is the 1-bit fast switching signal FSS, which is applied to the video output switch 80. In the manner previously described, the output switch 80, responsive to the FSS signal, switches between the primary video signal PVS and the reconstructed secondary video signal SVS' to define a small inset picture within a large main picture.

The 2-bit switching signal SS' is applied to a latch 804, which aligns the incoming SS' samples with the FCS/8K clock signal. The MSB's and LSB's of the switching signal SS' and the context code signal CCS are applied to the respective first and second input terminals of a pair of AND gates 806 and 808. The outputs of the AND gates 806 and 808 are applied to an OR gate 810. The output of the OR gate 810 is the FSS signal.

The inputs to the two AND gates 806 and 808 and the OR gate 810, and their respective outputs, are summarized in TABLE 5 below.

TABLE 5

| | | | OUTPUT | | |
|---|---|---|---|---|---|
| No. | SS' (a) | CCS (a) | AND GATE 806 | AND GATE 808 | OR GATE 810 (b) |
| 1 | 01 | 01 | 0 | 1 | 1 |
| 2 | 10 | 01 | 0 | 0 | 0 |
| 3 | 00 | 01 | 0 | 0 | 0 |
| 4 | 10 | 10 | 1 | 0 | 1 |
| 5 | 01 | 10 | 0 | 0 | 0 |
| 6 | 00 | 10 | 0 | 0 | 0 |

(a) SS' and CCS are precluded from being equal to 11.

(b) The output of the OR gate 810 is the 1-bit FSS signal.

If there is a match between the respective MSB's and LSB's of the two signals SS' and CCS (examples 1 and 4 in TABLE 5), the output FSS of the OR gate 810 is a logical one. Otherwise the output FSS of the OR gate 810 is a logical zero.

The output FSS of the OR gate 810 is applied to a pair of cascade connected latches 812 and 814 and a programmable delay 816 in order to align the FSS signal with the associated Y', U' and V' signals. The output of the programmable delay 816 is routed to the video output switch 80.

What is claimed is:

1. A television (TV) signal processing system comprising:
    a source of a first video signal FVS;
    a source of a second video signal SVS;
    means including sampling means coupled to receive said second video signal and responsive to a clock signal FCS of frequency fcs for developing m-bit digital second video signal samples occurring synchronously with said clock signal, where m is a positive integer greater than one;
    a source of an n-bit switching signal SS, where n is a positive integer greater than one;
    means for concatenating bits of said n-bit switching signal with predetermined samples of said sampled second video signal to form a digital combined signal consisting of samples occurring synchronously with said clock signal;
    means including memory means responsive to said clock signal for storing said combined sampled signal and for providing said combined sampled signal at an output terminal thereof synchronously with said clock signal;
    means coupled to receive said combined sampled signal and responsive to said clock signal for reconstructing said second video signal and said n-bit switching signal;
    a source of context code signal CCS;
    decoding means coupled to receive said reconstructed switching signal (hereinafter, SS') and responsive to said context code signal CCS for generating a fast switching signal FSS in synchronism with said clock signal, said fast switching signal FSS having a first state when said reconstructed switching signal corresponds to said coantent code signal and a second state otherwise; and
    switching means coupled to receive said first video signal FVS and said reconstructed second video signal (hereinafter, SVS') and responsive to said fast switching signal FSS for providing, at an output terminal thereof, said first video signal FVS and said reconstructed second video signal SVS' when said fast switching signal FSS is respectively in said second state and said first state.

2. The system defined in claim 1 wherein said second video signal SVS is an interlaced video signal comprising an odd field and an even field; wherein said memory includes two areas for respectively storing the odd and even fields of said second video signal SVS; wherein said switching signal SS stored in said two areas of said memory is respectively representative of said odd and even fields of said second video signal to be applied to said switching means output terminal; wherein switching signal SS stored in further areas of said memory is representative of the non-passage of said reconstructed second video signal from said memory to said switching means output terminal.

3. The system defined in claim 2 wherein said second video signal SVS comprises a luma signal Y and a pair of color difference signals U and V; wherein said means including said sampling means includes means coupled to receive said second video signal SVS for generating a stream of m-bit digital samples having the following sequence: $Y_0, U_0, Y_1, U_0, Y_2, Y_3, U_0, Y_4, V_0, Y_5, V_0, Y_6, V_0, Y_7, V_0, Y_8, U_1 \ldots$, where the subscripts 0, 1, 2 . . . represent the sample numbers and where the samples occur at the clock rate FCS.

4. The system defined in claim 3 wherein said means including said sampling means further includes means coupled to receive said m-bit second video signal samples for generating a stream of (m/2)+B-bit video signal nibbles, B an integer less than m, comprising
    first decimation means, responsive to said m-bit luma samples, for producing m-bit luma samples at a first subsample rate less than said frequency fcs;
    means responsive to said subsampled luma samples for producing a sequence of m/R-bit luma samples occurring at R times said first subsample rate, R an integer, R successive m/R-bit luma samples having m/R mutually exclusive adjacent bits of said subsampled luma samples;
    second decimation means responsive to said m-bit and U and V color difference samples, for producing a sequence of m-bit alternating U and V color difference samples occurring at a second subsample rate less than said first subsample rate; and means for concatenating mutually exclusive B-bits of said m-bit subsampled color difference samples to successive ones of said m/R-bit luma samples, to produce a sequence of (m/R)+B-bit nibbles, and wherein regularly occurring predetermined ones of said nibbles do not include bits of said color difference samples concatenated to said m/R-bit luma samples.

5. The system defined in claim 4 wherein said means for concatenating includes:
means responsive to said n-bit switching signal and said sequence of (m/R)+B-bit nibbles for concatenating bits of said n-bit switching signal to m/R-bit luma samples of said predetermined ones of said nibbles not including bits of said color difference samples.

6. The system defined in claim 5 wherein said rreconstructing means receives said (m/R)+B-bit nibbles occurring synchronously with said clock signal for generating an m-bit reconstructed luma signal Y', a pair of m-bit reconstructed color difference signals U' and V' and an n-bit reconstructed switching signal SS'.

7. The system defined in claim 6 wherein said reconstructing means further includes means coupled to receive said m-bit reconstructed digital luma and color difference signals Y', U' and V' and responsive to said clock signal for generating reconstructed analog luma and color difference signals.

8. The system defined in claim 7 wherein said reconstructing means further includes an encoding means coupled to receive said reconstructed analog luma and color difference signals for developing a reconstructed baseband composite video signal SVS' representative of said second video signal for application to said switching means.

9. The system defined in claim 1 wherein said second video signal SVS is an interlaced video signal comprising alternating odd and even fields; wherein said memory is provided with at least three areas for storing the successive incoming fields of said second video signal SVS in a circular or round-robin fashion; wherein said switching signal SS stored insaid at least three areas is fixedly assigned a respective one of thr several states of said switching signal; wherein said switching signal SS stored elsewhere in said memory is fixedly assigned still another state of said switching signal.

10. A television (TV) signal processing system comprising:
a source of a video signal having a luma signal component Y and a pair of color difference signal components U (ad) and V;
a source of clock signal;
sampling means coupled to receive said video signal components Y, U and V and responsive to said clock signal for developing a stream of 6-bit digital samples occurring synchronously with said clock signal, having the following sequence: $Y_0$, $U_0$, $Y_1$, $U_0$, $Y_3$, $U_0$, $Y_4$, $V_0$, $Y_5$, $V_0$, $Y_6$, $V_0$, $Y_7$, $V_0$, $Y_8$, $U_1$, $Y_9$, $U_1$..., where the subscripts 0, 1, 2, ... represent the sample numbers and where the samples occur at the clock rate CK;
means coupled to receive said 6-bit samples at said CK rate for generating a stream of 4-bit digital nibbles occurring at the CK/N rate, where N is an integer greater than or equal to one, including:
first decimation means, responsive to said 6-bit Y component samples, for producing 6-bit Y component samples occurring at a rate CK/2N;
second decimation means, responsive to said 6-bit U and V component samples, for producing an alternating sequence of 6-bit U and V component samples occurring at a rate CK/8N;
means, coupled to said first decimation means, and responsive to said 6-bit Y component samples occurring at a rate CK/2N, for producing a sequence of 3-bit Y component samples occurring at a rate CK/N, alternate 3-bit samples occurring at the rate CK/N containing the three more significant bits and the three lesser significant bits respectively of said 6-bit Y component samples occurring at the CK/2N rate; and
means, responsive to said 3-bit Y component samples and said 6-bit U and V component samples occurring at the CK/8N rate, for alternately concatenating said U and V samples to said Y component samples to produce a sequence of 4-bit nibbles wherein mutually exclusive single bits of respective 6-bit U or V samples are concatenated to six successive 3-bit Y samples and predetermined ones of 3-bit Y samples between each group of six successive concatenated samples do not include concatenated U or V bits; and memory means for storing said 4-bit nibbles.

11. The system defined in claim 10 further including:
a source of a switching signal in the form of 2-bit digital samples; and
means coupled to receive said 4-bit nibbles and said 2-bit switching signal samples and responsive to a CK/N clock signal for concatenating respective single bits of said 2-bit switching signal samples with respective ones of said predetermined ones of 3-bit Y samples.

12. The system defined in claim 10 further including:
a source of a 1-bit switching signal occurring synchronously with said clock signal; and
means coupled to receive said 4-bit nibbles and said 1-bit swiching signal and responsive to a CK/N clock signal for concatenating each of said 1-bit switching signal samples to a plurality of said predetermined ones of 3-bit Y samples.

* * * * *

UNITED STATES PATENT AND TRADEMARK OFFICE
CERTIFICATE OF CORRECTION

PATENT NO. : 4,821,086

DATED : April 11, 1989

INVENTOR(S) : David L. McNeely et al.

It is certified that error appears in the above-identified patent and that said Letters Patent is hereby corrected as shown below:

Col. 18, lines 17-18, "coantent" should read --content--.

Col. 18, line 46 should read --sequence: $Y_0$, $U_0$, $Y_1$, $U_0$, $Y_2$, $U_0$, $Y_3$, $U_0$, $Y_4$, $V_0$, $Y_5$, $V_0$, $Y_6$,--.

Col. 19, lines 17-18, "rreconstructing" should read --reconstructing--.

Col. 20, line 2 should read --$U_0$, $Y_2$, $U_0$, $Y_3$, $U_0$, $Y_4$, $V_0$, $Y_5$, $V_0$, $Y_6$, $V_0$, $Y_7$, $V_0$, $Y_8$, $U_1$,--.

Signed and Sealed this

Third Day of October, 1989

Attest:

DONALD J. QUIGG

Attesting Officer

Commissioner of Patents and Trademarks